Patented Oct. 21, 1952

2,615,001

UNITED STATES PATENT OFFICE 2,615,001

ABRASION RESISTANT WIRE ENAMELS

Edgar Q. Bullock, Jr. and Fred J. Emig, Chicago, Ill., assignors to E. I. du Pont de Nemours & Company, Wilmington, Del., a corporation of Delaware No Drawing. Application January 27, 1949, Serial No. 73,228

3 Claims. (Cl. 260—33.4)

This invention relates to wire enamels and more specifically to wire enamels which are highly resistant to abrasion and scraping.

In manufacturing armatures, electro-magnets, coils and similar electrical equipment in which the wire is wound around a removable form or an iron core, the enameled wire scrapes repeatedly the metal parts of the winding machine and the article on which it is wound. If the enamel coating is not highly resistant to scrape abrasion, the conductor may develop a short circuit and will not be usable. Sometimes the enamel is worn off, and the short circuit develops subsequently in use.

Enameled wire is also subjected to vibration with its resultant abrasion in many uses. It will be apparent therefore that scrape abrasion resistance is highly desirable in all wires and conductors having a coating of enamel insulation.

It is therefore the principal object of this invention to provide an insulating enamel which when applied by conventional means to a wire or similar conductor is highly resistant to scraping and abrasion. Another object is the provision of a wire coated with such enamel. Other objects will appear as the description of the invention proceeds.

These objects are accomplished by blending a compatible heat reactive synthetic resin, preferably a phenol-formaldehyde resin, with a polyvinyl acetal resin, preferably a polyvinyl formal resin (such as is sold on the open market under the trade name Formvar), together with a very small percentage of a polymer of ethylene.

The phenol-formaldehyde resin preferred is a heat-reactive soluble, 100% phenol-formaldehyde resin which can be readily obtained on the open market. For some purposes other soluble, heat-reactive resins, such as melamine-formaldehyde, urea-formaldehyde and substituted phenol-formaldehyde resins can be used. The polyvinyl acetal resin may be any disclosed in U. S. Reissue 20,430 to Morrison et al. or in U. S. Patent 2,307,588 to Jackson and Hall. While these patents cover the broad class known as acetals, the present invention preferably uses the polyvinyl formal modification disclosed therein.

The polymer of ethylene used in the examples is a solid at room temperature and has a structural formula of $(CH_2)_x$ and shows a crystalline structure by X-ray diffraction.

The preferred ethylene polymer has a density in the range of 0.922 and 0.988 with a molecular weight of about 9000 to 10000. These polymers may be prepared in general as outlined in Fawcett in U. S. Patent 2,153,553 and Krase U. S. Patent 2,388,160. Other ethylene polymers may be used, particularly those obtained by polymerizing ethylene in the presence of chain-terminating agents such as dioxolane, cyclohexane, methyl propionate, propionic anhydride, diethyl ether, methanol and hydrogen. The preparation of these modified ethylene polymers is described in Peterson et al. U. S. Patent No. 2,395,292 and in S. N. 438,466, filed April 10, 1942, now Patent No. 2,440,800 (Hanford et al); S. N. 445,012, filed May 29, 1942, now Patent No. 2,394,862 (Loder et al.); S. N. 532,219, filed April 21, 1944, now Patent No. 2,479,082 (Roland et al.); S. N. 557,723, filed October 7, 1944, now Patent No. 2,456,387 (Cooper); and S. N. 583,394, filed March 17, 1945, now Patent No. 2,433,015 (Roland et al.).

The invention is illustrated, but not limited, by the following examples in which the parts are by weight:

EXAMPLE I

*Clear wire enamel*

| | |
|---|---:|
| High solvency petroleum hydrocarbon (B. P. 150° C. to 184° C.) | 428.00 |
| Commercial cresylic acid | 168.25 |
| Furfural | 73.00 |
| Phenol-formaldehyde resin | 44.25 |
| Polyvinyl formal resin | 88.50 |
| Polymer of ethylene dispersion | 2.00 |
| | 804.00 |

The polymer of ethylene dispersion used in the above example contains about 6.5% polymer of ethylene in a finely divided form dispersed in high solvency petroleum hydrocarbon, cresylic acid and a small amount of phenol, polyvinyl formal resin, and phenol-formaldehyde resin. The clear wire enamel of this example is made by conventional methods such as dissolving the two resins in a mixture of the three liquids and finally blending therein the polyethylene dispersion followed by conventional varnish filtration to remove the foreign matter. The resulting wire enamel when applied by conventional means and cured at about 585° F. produces insulated wire with improved resistance to scrape abrasion with other physical and chemical properties substantially equal to those not containing polymer of ethylene. In this example the polymer of ethylene content is about 0.1% based on the resin solids. The clear wire enamel without the polymer of ethylene gave an abrasion resistance value substantially one-half of that of Example I containing the polymer of ethylene indicated. The test used for abrasion resistance is one adopted by the National Electrical Manufacturers Association and consists essentially of repeatedly scraping the surface of a coated wire with a rigid steel wire of 0.16 inch in diameter which passes over the wire being tested at right angles under a uniform weight which forces the steel wire against the test section of the coated wire. The scrape abrasion resistance is rated by the number of cycles, i. e. one forward plus one backward scrape required to wear through the enamel coating and cause a metal to metal contact as indicated by the completion of an electrical circuit connected to the two wires.

The enamel of the examples were tested by coating a #18 (American wire gauge) copper wire with six coats of the enamel with baking or curing at 585° F. between each coat.

EXAMPLE II

*Clear wire enamel*

| | |
|---|---|
| High solvency petroleum hydrocarbon (B. P. 150° C. to 184° C.) | 428.0 |
| Commercial cresylic acid | 59.0 |
| High boiling tar acids (B. P. range 225° C. to about 275° C.) | 72.8 |
| Phenol-formaldehyde resin | 44.2 |
| Polyvinyl formal resin | 88.5 |
| Phenol | 109.6 |
| Polymer of ethylene dispersion | 4.0 |

The enamel in the above example was prepared as indicated in Example I. The polymer of ethylene dispersion is the same as that used in Example I and is present in amount of about 0.2% based on the resin solids. The abrasion resistance of the enamel of this example was substantially three times that of one containing no polymer of ethylene but otherwise the same.

The above examples illustrate the invention with respect to clear wire enamels. It is to be understood, however, that pigments which do not impair the insulating properties of the enamel may be used for preparing colored enamels for identification or other purposes. For example, in the preparation of a green enamel, phthalocyanine green pigment to the extent of about 1½% of the entire composition may be added. The pigment is usually dispersed or ground in a portion of the vehicle until a smooth dispersion is obtained and then added to the main bulk of the mix.

In the examples it will be noted that the polyvinyl formal resin is present in amount of two times the phenol-formaldehyde resin. It is preferred to have at least as much as equal parts of polyvinyl formal as phenol-formaldehyde although the former may be present in amount up to about nineteen times as much as the phenol-formaldehyde. Other compatible heat reactive synthetic resins may replace in part or entirely the phenol-formaldehyde resin.

In the above examples the invention has been illustrated by using 0.1% and 0.2% of polymer of ethylene based on the resin solids. The percentage of polymer of ethylene may be increased, however, up to about 0.5%. A greater increase in the percentage of polymer of ethylene has an adverse effect on the other required properties of the insulating enamel.

In Fletcher U. S. Patent No. 2,448,666, it has been proposed to mix polyvinyl acetal resins, particularly the polyvinyl butyral, with about equal parts of polymer of ethylene. In the patent as low as 10% of polymer of ethylene may be used based on the total resins, but such high concentrations of polymer of ethylene render the subsequent coating impractical as a wire enamel. When wire coated with Fletcher's composition is flexed sharply, the coating fails. The abrasion resistance of such a coating is far below that accepted by the trade.

It will be apparent therefore that the present invention represents a delicate balance between a large number of factors such as dielectric value, toughness, durability, adhesion to copper, resistance to oil, water, greases, and particularly resistance to scrape abrasion. It has been found that no Formvar type of wire enamel known up to the present time is as satisfactory as those disclosed herein containing from 0.1% to 0.5% of polymer of ethylene based on the weight of the resin content.

The enamel without the polymer of ethylene represents one of the most satisfactory all around insulating enamels known in the art. It is therefore surprising that such a small percentage of polymer of ethylene can increase its abrasion resistance by 200% to 300% or more.

It is apparent that many widely different embodiments of this invention may be made without departing from the spirit and scope thereof, and therefore, it is not intended to be limited except as indicated in the appended claims.

We claim:

1. A wire enamel comprising in parts by weight a compatible mixture of one part of a heat-hardenable soluble phenol-formaldehyde resin, from 1 to 19 parts of a polyvinyl formal resin and from 0.1% to 0.5% of a polymer of ethylene based on the resin solids of the composition, the said polymer of ethylene being solid at room temperature with a structural formula of $(CH_2)x$ and showing a crystalline structure by X-ray diffraction.

2. The enamel of claim 1 which has the following composition in parts by weight:

| | |
|---|---|
| High solvency petroleum hydrocarbon (B. P. 150° C. to 184° C.) | 428.0 |
| Commercial cresylic acid | 59.0 |
| High boiling tar acids (B. P. range 225° C. to about 275° C.) | 72.8 |
| Phenol-formaldehyde resin | 44.2 |
| Polyvinyl formal resin | 88.5 |
| Phenol | 109.6 |
| Dispersion containing 6.5% of a polymer of ethylene | 4.0 |

3. An electrical conductor having a smooth, tough durable abrasion-resistant film of the composition of claim 1 on its surface.

EDGAR Q. BULLOCK, Jr.
FRED J. EMIG.

REFERENCES CITED

The following references are of record in the file of this patent:

UNITED STATES PATENTS

| Number | Name | Date |
|---|---|---|
| 2,307,588 | Jackson et al. | Jan. 5, 1943 |
| 2,395,894 | May | Mar. 5, 1946 |
| 2,472,680 | Pratt | June 7, 1949 |
| 2,518,462 | Bowing et al. | Aug. 15, 1950 |

FOREIGN PATENTS

| Number | Country | Date |
|---|---|---|
| 241,210 | Switzerland | July 1, 1946 |